(12) United States Patent
Sogo et al.

(10) Patent No.: US 6,611,990 B1
(45) Date of Patent: Sep. 2, 2003

(54) SUPPORTING MECHANISM OF SLIDE DOOR

(75) Inventors: Masanori Sogo, Osaka-fu (JP); Makoto Sasaki, Osaka-fu (JP)

(73) Assignee: Komatsu Limited, Tokyo (JP)

( * ) Notice: Subject to any disclaimer, the term of this patent is extended or adjusted under 35 U.S.C. 154(b) by 106 days.

(21) Appl. No.: 09/662,620

(22) Filed: Sep. 15, 2000

(30) Foreign Application Priority Data

Sep. 17, 1999 (JP) ............................................ 11-264398

(51) Int. Cl.⁷ .................................................. B60J 5/06

(52) U.S. Cl. ...................... 16/87 R; 16/91; 296/190.11; 296/202; 296/155

(58) Field of Search ............................. 16/87 R, 87.4 R, 16/91, 88, 90, 107; 296/190.11, 202, 155; 49/501, 215, 214, 213

(56) References Cited

U.S. PATENT DOCUMENTS

| | | | |
|---|---|---|---|
| 4,152,872 A | * 5/1979 | Tanizaki et al. | 49/215 |
| 4,530,184 A | * 7/1985 | Chikaraishi et al. | 49/213 |
| 5,322,339 A | * 6/1994 | Dubernard | 296/155 |
| 5,564,774 A | * 10/1996 | Shinsen | 296/190.11 |
| 5,577,795 A | * 11/1996 | Shinsen | 296/190.11 |
| 5,832,668 A | * 11/1998 | Faubert et al. | 49/215 |
| 5,906,071 A | * 5/1999 | Buchanan, Jr. | 49/214 |
| 5,967,595 A | * 10/1999 | Heya et al. | 296/155 |

FOREIGN PATENT DOCUMENTS

| | | |
|---|---|---|
| JP | 6-24442 | 3/1992 |
| JP | 5-38057 | 5/1993 |
| JP | 7-4555 | 1/1995 |
| JP | 7-4556 | 1/1995 |
| JP | 9-235753 | 9/1997 |

OTHER PUBLICATIONS

Kitada, T., et al., Introduction of Products, PC50UU-2, PC75UU-2 avance UU Series, Komatsu Technical Report, vol. 38, No. 129 (1992), pp. 54–63, Japan.

Tomoo Kitada, Taiichiro Kitatani, Kiyoshi Sugiyama, Tamotsu Shinnou and Mitsuhisa Shinsen, Komatsu Technical Report Introduction of Porducts, PC50UU-2, PC75UU-2 avance UU Series, vol. 38, No. 129 (1992), pp. 54–63, Japan.

An English Abstract for JP 5–38057 is enclosed.
An English Abstract for JP 7–4555 is enclosed.
An English Abstract for JP9–235753is enclosed.

* cited by examiner

Primary Examiner—Anthony Knight
Assistant Examiner—Doug Hutton
(74) Attorney, Agent, or Firm—Bell, Boyd & Lloyd LLC

(57) ABSTRACT

The invention provides a supporting mechanism of a slide door in which a lower end rail portion being most easily dirty in a slide door opening and closing portion is hardly get dirty and an operation can be smoothly and without being shaky performed even when a great load is locally applied to the slide door at a time of moving the slide door. The supporting mechanism of the slide door has upper and lower rails extending along edge portions of upper and lower ends of the entrance/exit and guide rollers respectively provided at least in upper and lower end portions of a front edge of the slide door. The lower rail is constituted by one narrow plate rail having a lower end edge being a free end, the lower guide rollers include a set of two or more rolling rollers, and the set of two or more rolling rollers hold and support the lower rail therebetween from below so as to freely roll. Accordingly, even when a local external force is applied at a time of opening and closing the slide door so as to generate a little deformation, it is possible to smoothly open and close the door without being shaky. Further, since a portion where the lower rail is placed has no room where the earth and sand are accumulated, the rail is not clogged by the earth and sand after a long time use, so that it is possible to secure a smooth opening and closing operation.

5 Claims, 9 Drawing Sheets

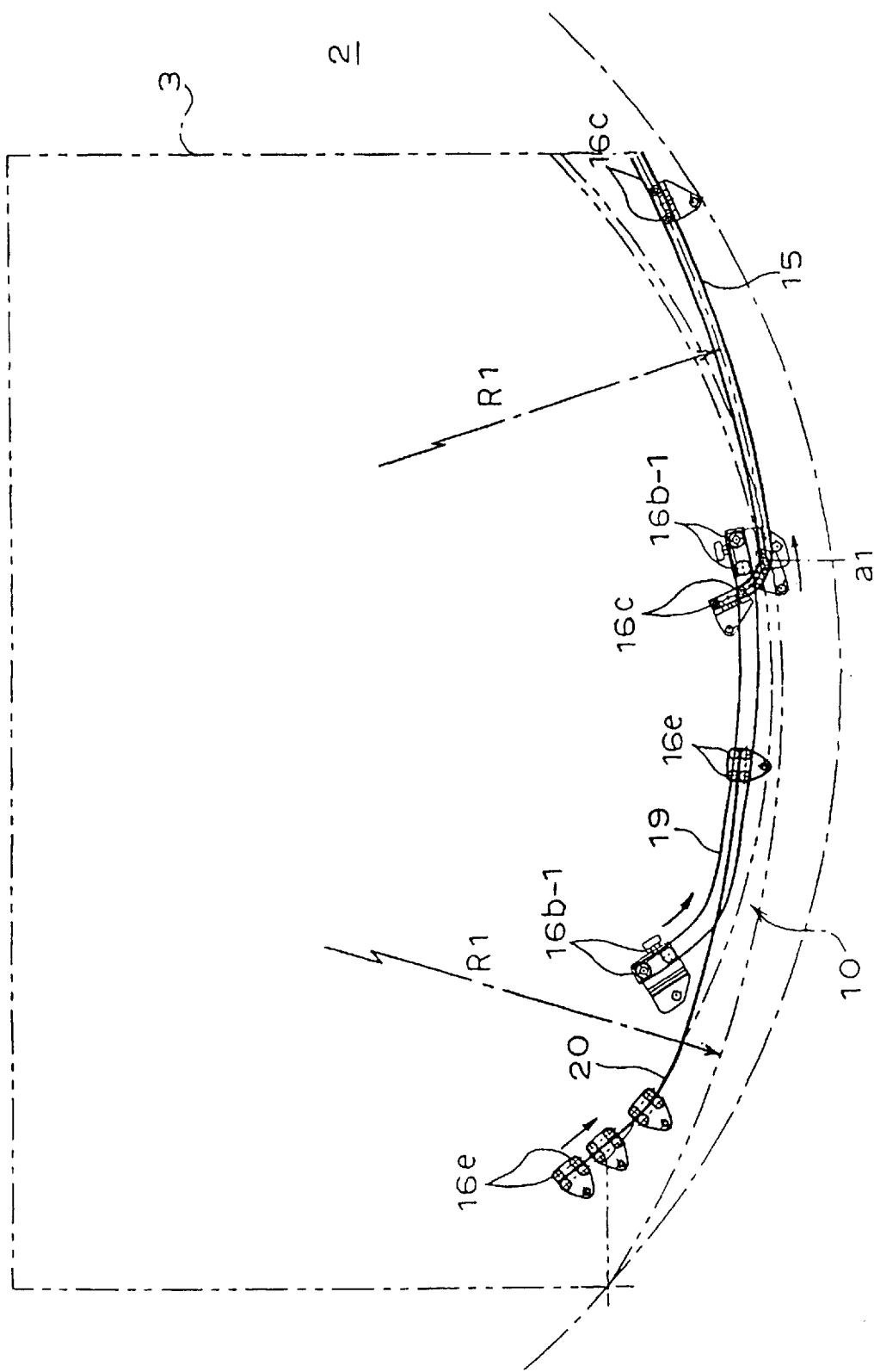

SUPPORTING MECHANISM OF SLIDE DOOR

BACKGROUND OF THE INVENTION

1. Field of the Invention

The present invention relates to a supporting mechanism of a slide door supported to a cab of a construction machine, for example, a hydraulic shovel, a crane vehicle or the like, and particularly relates to a supporting mechanism of a slide door which can be smoothly opened and closed even in the case that a great load is locally applied to a slide door surface at a time of being opened and closed.

2. Description of the Related Art

In recent construction machines, for example, as disclosed in the publication of Japanese Utility Model No. 2526932, a cab placed on a revolving deck on a wheel-type or track-type travel unit or the like is made compact so as to be accommodated in a moving track thereof, avoiding an interference with an implement at a time of working. Further, in order to secure safety, comfortableness and an effective space at a time of rotating the revolving deck, the structure is made such that an entrance and exit of the cab is opened and closed by a slide door, an outer side surface portion including the slide door is placed within a circular arc surface having a radius of curvature close to a maximum swing radius of the revolving deck and the slide door is formed in the same circular arc surface shape as the outer side surface portion, thereby being slid along the circular arc surface.

A window is provided on a whole surface of a front surface portion of the cab, particularly the field of view of the front upper portion is made wider through the front surface window portion so as to improve an operability, and in order to avoid the interference with the implement such as a bucket, a boom or the like, the upper side of the front surface portion is formed in a rearward inclined shape so that the upper side is positioned toward the rear portion.

In this case, in a structure in which pillars stood from four corners of the cab vertically stand in parallel with each other, even when an outer side surface of the cab is formed in a circular arc shape along an outer diameter of the revolving deck as mentioned above, it is possible to form the pillar in the same thickness all along its vertical direction. However, in the case that the upper portion of the front surface window portion of the cab is formed in a rearward inclined shape as mentioned above, when the outer side surface portion is formed in a single circular arc portion, that is, a part of a cylinder body, in the front pillar stood between the front surface window portion and the outer side surface portion so as to be vertical in a front view, a lateral width in a side view is gradually increased in correspondence to an angle of incline of the front surface window portion from an incline starting point of the front surface window portion to an upper end, thereby significantly reducing the field of view of the outer front upper portion of the cab. Accordingly, for example, in the publication of Japanese Utility Model No. 2526933, a substantially whole surface of the outer side surface is inward inclined toward the upper portion, and the lateral width of the front pillar in the front view is made uniform, whereby the machine body is totally balanced.

Further, an upper slide mechanism of the slide door disclosed in the publication mentioned above is structured such that a first rail horizontally extending in a longitudinal direction is mounted to a lower end of a supporting bracket suspended from a hood of the cab, a first roller mounted to an upper inner surface in a front end side of the slide door is rolled on the first rail, a second rail having an inverted U cross sectional shape is provided on an outer side surface of the supporting bracket, and a second roller mounted to an upper inner surface in a rear end side of the slide door is loosely fitted to the second rail from below, thereby being guided and rolled around a vertical axis. On the contrary, a lower slide mechanism of the slide door is structured such that third and fourth rollers mounted to front and rear portions of the inner surface of a lower end portion of the slide door are loosely fitted to a third rail provided along a lower end edge of the cab and having an inverted U cross sectional shape from below, whereby the third and fourth rollers at front and rear portions are respectively guided and rolled around the vertical axis.

Further, for example, in the cab disclosed in the publication of Japanese Patent No. 2722055, a curvature of a front half portion of the outer side surface portion of the cab is set to the same radius of curvature vertically, the structure is formed in a three dimensional curved surface obtained by moving a center point of circular arc rearward as moving upward so that all the circular arcs cross at a boundary line between the front half portion and a rear half portion in the outer side surface portion, and the structure is made such that a width in the side surface side of the pillar does not change in a vertical direction, thereby securing the field of view of the outer front surface upper portion of the cab.

In this publication, a door slide surface in a door opening portion of the cab is defined by a lower circular arc having the same center as a rotational center of the revolving deck from a lower end of the pillar in a lower end of the door opening portion and brought into contact with a position having a maximum cab width from the lower end of the door opening portion, an outer lower end of a rear end surface of the dab is formed by a basic circular arc connecting a point positioned inside the revolving deck with respect to a crossing point between the rear end surface and the lower circular arc to the lower end of the door opening portion, and a portion between the lower end of the door opening portion and the upper end of the door opening portion is defined by the same circular arc obtained by shifting the center of the basic circular arc rearward in correspondence to a rearward inclination of the front window portion. Then, the outer side surface disposed at the rear of the door opening portion and reaching the rear end of the cab is formed as the same cylinder surface comprising the basic circular arc connecting between the rear end of the door opening portion and the rear end of the cab.

In accordance with the structure mentioned above, in the cab for the construction machine disclosed in the publications mentioned above, even when the front surface window portion of the cab is formed so as to have the same width vertically and the upper portion thereof is inclined rearward, an appearance viewed from the front portion of the cab is excellent while the cab width is made maximum, it is easy to produce the structure, and the door stopper provided at the rear end of the cab is not protruded from the revolving deck.

However, in accordance with the cab for the construction machine disclosed in the publications mentioned above, the door opening portion in the outer side surface portion of the cab is formed in the three dimensional curved surface as mentioned above, and the rear outer side surface portion between the rear end of the door opening potion and the rear end of the cab is formed in the cylinder surface. The three dimensional curved surface of the door opening portion and the cylinder surface of the rear outer side surface portion are formed in the shape along the basic circular arc having the same radius in the plan view as mentioned above, however, for example, the three dimensional curved surface side in the upper end of the door opening portion is formed in a shape along the circular arc obtained by moving the center point thereof from the center of the cylinder surface of the rear outer side surface portion to the rear portion.

In this case, the basic circular arc in the lower end of the door opening portion is in inward contact with the lower circular arc passing through the lower end of the front outer side pillar. Accordingly, if the cylinder surface of the rear outer side surface portion is, for example, in the cylindrical shape along the lower circular arc, the three dimensional curved surface and the cylinder surface of the rear outer side surface portion can be formed in a shape of being smoothly connected with the inner contact point as the boundary by rearward moving the center point in correspondence to each of height positions on the outer side edge of the front window portion and subsequently calculating the circular arc being inward contact with the lower circular arc at the rear end so as to form the three dimensional curved surface.

However, in any cases, it is necessary that the whole shape of the slide door mentioned above is provided with the same configuration along the outer side surface portion of the cab having the three dimensional curved surface in at least a part thereof, as mentioned above. Further, the slide mechanism of the slide door is structured such that a guide track of the rail arranged in the upper and lower end edge portions of the outer side surface portion of the cab or in the center portion is generally formed in a curved line along the longitudinal direction of the outer side surface portion, as well as the slide door disclosed in the publication of Japanese Utility Model mentioned above. Accordingly, when opening and closing the slide door, in particular, when opening an opening portion of an access port for passenger by the slide door, the inner surface of the three dimensional curved surface portion rides over the rear outer side surface portion of the cab via an intermediate pillar, whereby the whole of the door is necessarily lifted up outwardly from the rear outer side surface portion.

As a result, it is necessary to set the placing position of the cab placed in the revolving deck mentioned above to a position obtained by moving the outer side surface portion of the cab toward the center side from the circular arc of the radius of swing of the revolving deck by the lifted-up amount of the slide door, causing to narrow a interior volume of the cab. Further, particularly at a time of opening the slide door, an excessive force is applied to a part of the door when the door rides over the rear outer side surface portion of the cab, whereby there may be a case that a problem to the door opening operation is generated. In order to deal with the matter and in order to make it easy to make the inner surface of the three dimensional curved surface portion ride over the rear outer side surface portion of the cab, the structure can be made such that the supporting mechanism of the door provided between the door and the cab, particularly, a portion between the rail portion and the rolling roller has a margin so as to expand a gap between the door and the cab. However, in the structure mentioned above, there is necessarily generated a portion which is largely shaky locally on the slide track of the door between the door and the cab, so that there is a risk that a function as the door is lost due to the influence of wobbling even when the door is closed.

SUMMARY OF THE INVENTION

The present invention is made so as to solve the problems mentioned above, and a particular object thereof is to provide a supporting mechanism of a slide door in which a lower end rail portion which is most easily get dirty in a slide door opening and closing portion does not get dirty and an operation can be smoothly and without being shaky can be performed even when a great load is locally applied to the slide door at a time of operating the slide door.

The object mentioned above can be effectively achieved by the present invention.

In accordance with the invention, there is provided a supporting mechanism of a slide door placed in an entrance/exit comprising: upper and lower rails extending along edge portions of upper and lower ends of the entrance/exit; and guide rollers respectively provided at least in upper and lower end portions of a front edge of the slide door. In this mechanism, the lower rail is constituted by one narrow plate rail having a lower end edge being a free end, the lower guide rollers include a set of two or more rolling rollers, and the set of two or more rolling rollers hold and support the lower rail therebetween from below so as to freely roll.

For example, since the lower rail is suspended downward from a floor surface of the entrance, it is hard that dusts and earth and sands are stored in the rail, so that the guide rollers maintain a smooth rolling property after a long time use. Further, since the lower guide rollers roll along the rail while holding the lower rail therebetween, the lower guide rollers can smoothly roll without being shaky along the entrance, for example, even when a little excessive force is applied to a lower end of the door, so that there would be no gap between the door and the entrance and exit.

Preferably, the upper rail includes a first rail having a free end at a lower end edge thereof; and a second rail substantially horizontally extending toward an outer side, and the upper guide rollers are constituted by first rolling rollers composed of a set of two or more rollers having a substantially vertical rolling axis, and a second rolling roller having a substantially horizontal rolling axis, and the first rolling rollers of the set of two or more rollers are gripped and supported with respect to the first rail from below, and the second guide roller is supported and guided to an upper surface of the second rail so as to roll.

In accordance with the present invention, in addition to the supporting mechanism of the lower end portion of the front edge in the slide door, the supporting mechanism of the upper end portion of the front edge is defined. In accordance with the supporting mechanism of the upper end portion of the front edge, since a main weight of the slide door is supported by the second rail in the room side, it is possible to sufficiently support the slide door by the supporting mechanism of the lower end portion of the front edge as mentioned above, and further since the first guide roller is gripped and supported by the first rail from below in the same manner as that of the supporting mechanism of the lower end portion of the front edge, it is possible to prevent the door upper end portion from being shaky.

Further preferably, each of the guide rollers is formed in a drum shape. In accordance with the guide rollers having the configuration as above, for example, even when a load is applied to each of the guide rollers from various directions and the supporting axis thereof is elastically deformed and the rolling surface of the guide roller moves in a direction of the supporting axis, the rolling portion of the guide roller brought into contact with the rail is always in point contact, so that it is possible to always secure a smooth rolling at a small friction resistance.

Still further preferably, the supporting portion of each of the guide rollers having the substantially vertical rolling axis can rotate around the vertical axis. In accordance with the structure mentioned above, the guide roller can be easily guided along the rail drawing the curved track in a further smooth manner.

BRIEF DESCRIPTION OF THE DRAWINGS

FIG. 8 is a plan view showing an example of a guiding track of the slide door when simply forming a lower end edge of the outer side surface portion of the cab by the same circular arc between front and rear portions.

DESCRIPTION OF THE PREFERRED EMBODIMENTS

Figure 1:
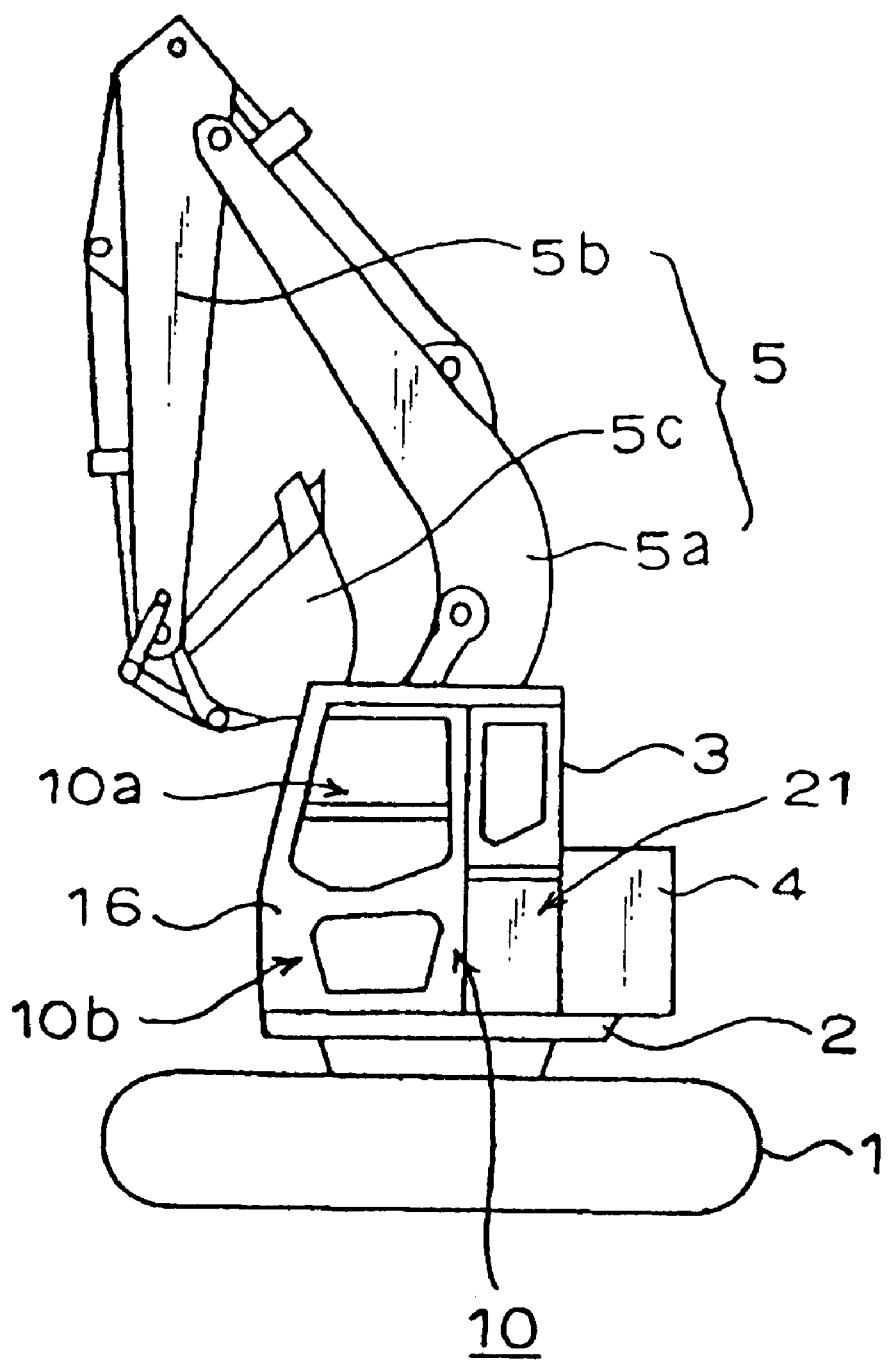
FIG. 1 is a side view of a hydraulic shovel having a cab to which a slide door provided with a supporting mechanism in accordance with the present invention is applied.

A representative embodiment is specifically described below in accordance with the present invention with reference to the accompanying drawings. FIG. 1 shows a hydraulic shovel which is a typical embodiment to which a supporting mechanism of a slide door in accordance with the present invention is applied. The hydraulic shovel is provided with a revolving deck 2 on a travel unit 1. A cab 3 and an engine room 4 are provided and an implement 5 is mounted on the revolving deck 2. The implement 5 is constituted by a boom 5a having a base end pivoted around a center of rotation of the revolving deck 2, an arm 5b pivoted to a front end of the boom 5a, a bucket 5c pivoted to a front end of the arm 5b and the like. The cab 3 mentioned above is placed so as to be shifted to a right side of the implement 5 on the revolving deck 2 in a front view.

Figure 2:
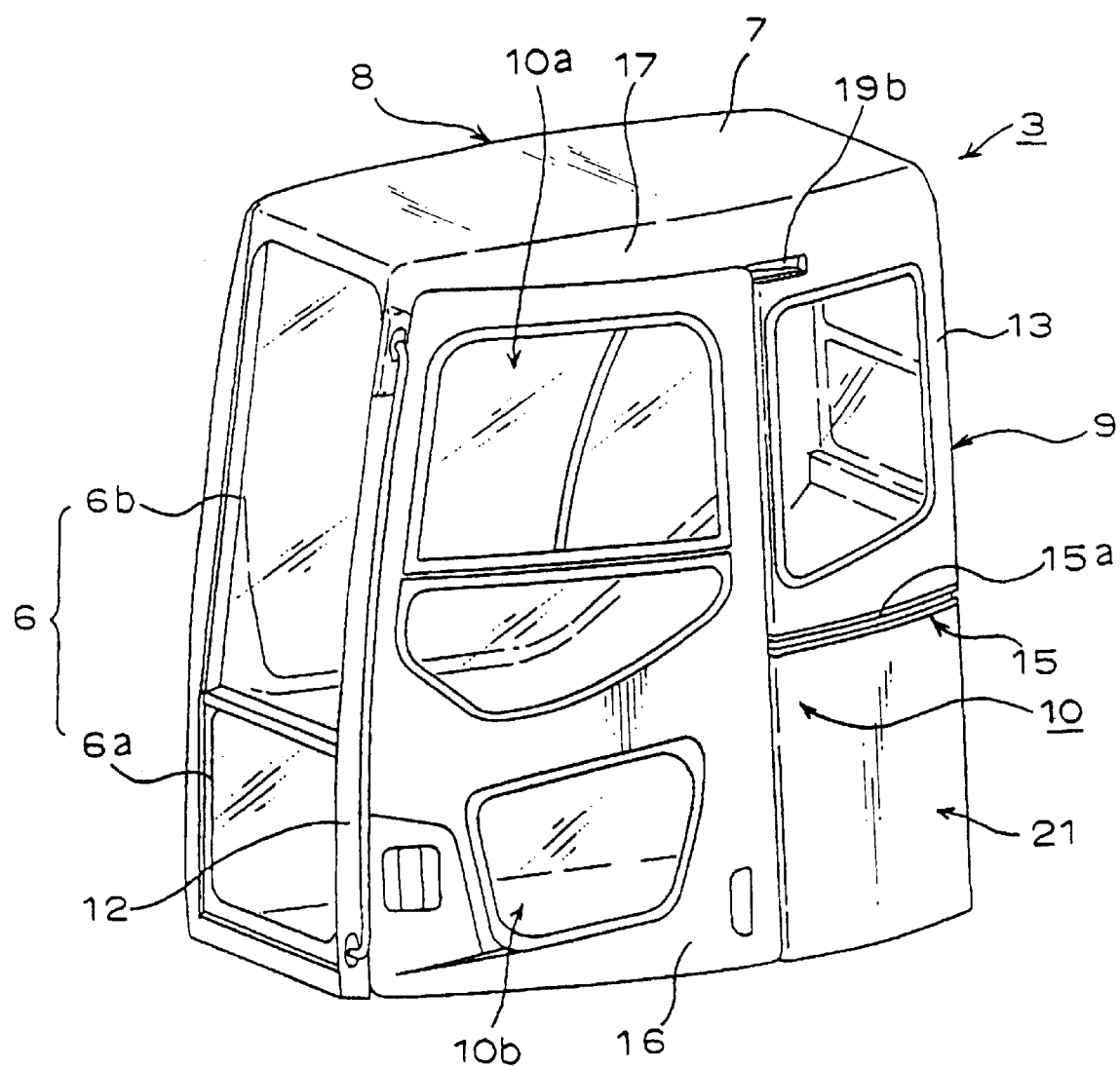
FIG. 2 is a perspective view of the cab when the slide door is closed.
Figure 3:
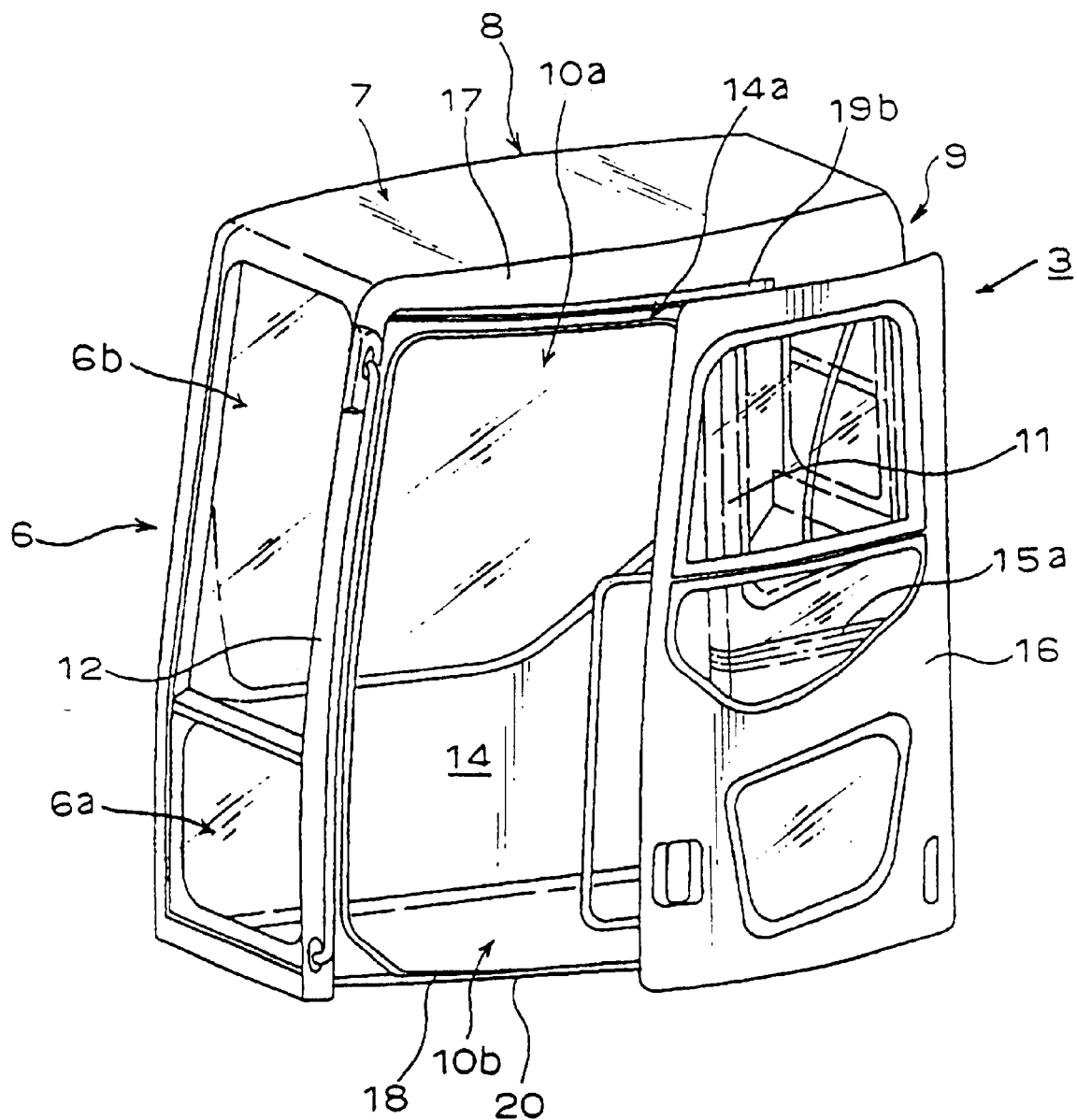
FIG. 3 is a perspective view of the cab when the slide door is opened.

The cab 3 is formed in a rectangular parallelepiped box shape as shown in FIGS. 2 and 3. A front surface portion 6 thereof is constituted by a vertical surface 6a substantially vertically standing up to a position of substantially one third height from a lower end, and an inclined surface 6b rearward inclined from an upper end of the vertical surface 6a to a top plate portion 7 so as to stand up. Further, a plate glass or a transparent resin plate is fitted to each of the vertical surface 6a and the inclined surface 6b. Accordingly, the front surface portion 6 is formed in a substantially wide V shape in a side view. Further, each of an inner side surface portion 8 and a rear surface portion 9 disposed in a left side in a front view is constituted by a vertical surface, and a plate glass or a transparent resin plate is fitted to an upper half surface or a less area of each of panels. The front surface portion 6 is rearward inclined in the manner mentioned above for the purpose of securing an upward field of view and avoiding an interference between the implement 5 and the cab 3.

An outer side surface portion 10 connecting between the outer end edges of the front surface portion 6 and the rear surface portion 9 in the front view is formed in a curved surface expanding outward. In accordance with the present embodiment, an intermediate pillar 11 stands at a position of substantially two third of a longitudinal width from a front end on the lower end of the outer side surface portion 10, and an access port 14 for an operator is formed between a rear end of a front pillar 12 and a front end of the intermediate pillar 11, whereby a front half portion of the present invention is structured. Further, a plate glass or a transparent resin plate is fitted to an upper half portion of a panel between the intermediate pillar 11 and a rear pillar 13, and a horizontally extending intermediate guiding rail portion 15 of a slide door 16 is formed in a lower portion thereof, whereby a rear half portion is structured.

Figure 4A:
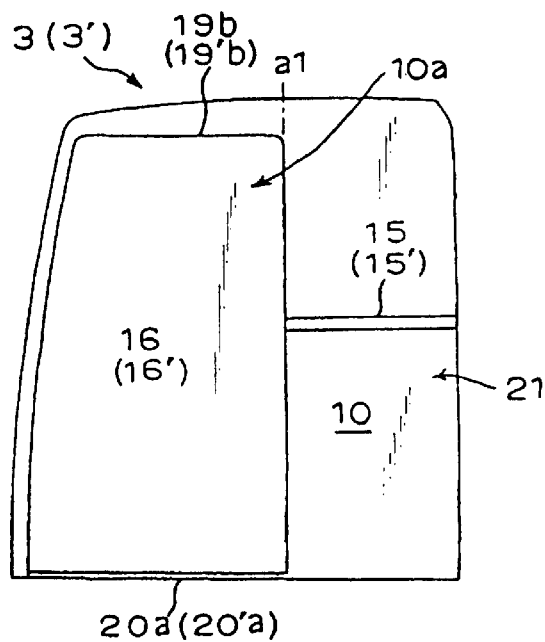
FIGS. 4A to 4C are structural explanatory views schematically showing a shape in a top view and a sterepscopic shape of an outer side surface portion of the cab.
Figure 4B:
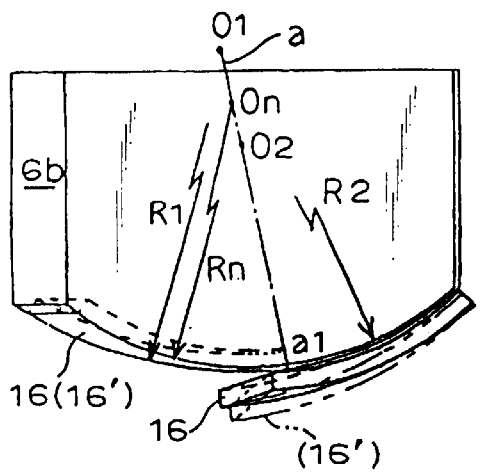
Figure 4C:
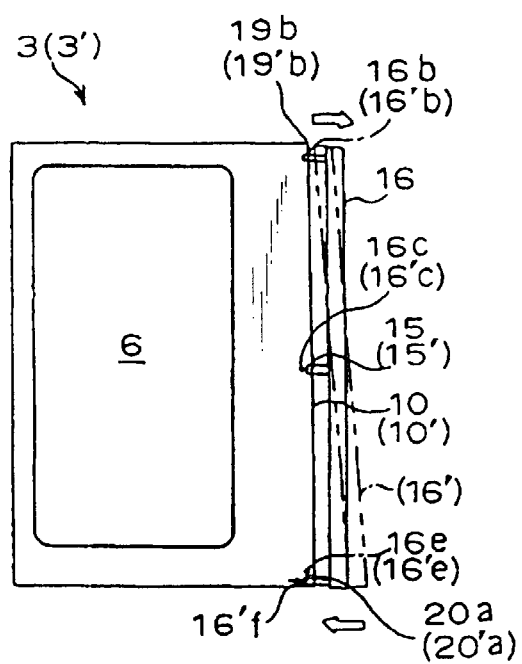

In accordance with the present embodiment, the front half portion of the cab outer side surface portion 10 is constituted by a single cylindrical surface area 10b in an area from the lower end of the access port 14 to the height position of substantially one third therefrom, and the remaining upper substantially two third area is constituted by a three dimensional curved surface area 10a. Further, a rear half portion of the cab outer side surface portion 10 is constituted by a two dimensional curved area 21 smoothly connecting to the cylinder surface area 10b and the three dimensional curved area 10a. FIGS. 4A to 4C schematically show a stereoscopic view and a top view of the cab for explaining a shape of the outer side surface portion 10. In FIGS. 4A to 4C, in order to easily understand, all of the front half portion of the outer side surface portion 10 is formed in the three dimensional curved surface area 10a in a circular arc direction (longitudinal direction) and the cylindrical surface area 10b and the vertical surface 6a of the front surface portion 6 are omitted to be illustrated. However, even in the embodiment shown in FIGS. 2 and 3 and having the structure mentioned above, it is a matter of course that the effect of the present invention can be obtained.

A shape of the outer side surface portion 10 is specifically described below with reference to FIGS. 4A to 4C.

The three dimensional curved area 10a and the two dimensional curved area 21 are sectioned by a boundary line a1 being vertical in a side view. The boundary line a1 exists on a line a in a top view. When a driver sits on a driver's seat (not shown) within the cab, an elbow of the driver is positioned near the line a. The three dimensional curved area 10a is structured such that a front edge lower end thereof is on a substantially maximum swing radius of the revolving deck 2 and the area from the front edge lower end to the front end of the three dimensional curved area 10a is inclined obliquely rearward so that the front pillar 12 does not protrude to the outer side of the cab 3 in a front view so as to stand up.

Then, there is provided a three dimensional curved shape smoothly connecting the rear end thereof with a circular arc having a radius of curvature R2 brought into inner contact with the two dimensional curved surface area 21 on the boundary line a1 while gradually reducing the radius of curvature from the lower end toward the upper end with respect to the rear end edge in correspondence to the inclination (changing from a radius of curvature R1 of the lower end to a radius of curvature Rn of the upper end). In this case, the boundary line a1 is set to the substantially vertical line in the present embodiment, however, in an example shown in FIG. 4A, it is inclined inward at the upper portion for explanation. Here, in the illustrated cab shape, in a relation R1>Rn>R2, in order to smoothly connect the outer side surface portion 10 of the cab 3 between the front and rear portions, the structure is designed such as to place each of centers O1, On and O2 of a circular arc of the radius of curvature R1 in the lower end of the front half portion, a circular arc of the radius of curvature Rn in the upper end and a circular arc of the radius of curvature R2 in the rear half portion on the line a, whereby the rear end edge of the front half portion and the front end edge of the rear half portion are brought into inner contact with the circular arc having the radius of curvature R1 in the lower end of the front half portion, on the boundary line a1.

An effect obtained by the structure mentioned above in the front half portion of the outer side surface portion 10 is as follows.

At first, the front edge lower end of the three dimensional curved area 10a, which is in the same position i plan view as the front edge lower end of the cab 3 is positioned on the maximum swing radius of the revolving deck 2. With respect to the front surface portion 6, this enables to secure a greater area of the front surface on the assumption that the cab 3 is within the swing radius of the revolving deck 2, in comparison with the case that the lower end of the cab is positioned at a portion smaller than the maximum swing radius of the revolving deck, for example, as described in the publication of Japanese Patent No. 2722055 corresponding to the prior art. This directly expands the front field of view and improves a comfortable property of the driver due to an increase of the inner volume of the cab. Further, by standing up the front end of the three dimensional curved surface area 10a with inclining rearward from the lower end toward the upper end, so that the front pillar 12 connected to the front end does not protrude outward from the cab 3, the appearance in the front view is also improved.

Further, the front end of the outer side surface portion 10 shown in FIG. 4A, that is, the front end of the three dimensional curved surface area 10a is inclined toward the inner side of the cab as going upward, however, the boundary line a1, that is, the rear end of the three dimensional curved surface area 10a is in the substantially vertical line in side view (see FIG. 4A) and is slightly inclined toward the inner side of the cab as going upward along the boundary line a1 as mentioned above.

Conventionally, in the cab in which the front surface portion 6 is inclined and the outer side surface portion 10 is formed in a shape similar to the cylinder body, when balancing so that the front pillar does not protrude to the outer side of the cab in the front view, as described in the the present invention, since the inclination of the upper portion of the three dimensional curved area 10a to the inner side of the cab is gradually reduced from the front end toward the rear end, a volume within the cab, particularly a volume within the cab visible when the driver sits on the driver's seat within the cab is increased, a comfortable drive property is improved. However, when employing the structure of the outer side surface portion 10 mentioned above, the front edge lower end or the rear edge upper end of the slide door 16 largely protrudes to the outer side of the cab 3 at a time of opening and closing the slide door, so that there is a problem that the cab 3 is not in the swing radius at a time of opening the slide door 16. Solving means for this problem will be described below.

The rear half portion via the boundary line a1 of the outer side surface portion 10 is constituted by a single cylindrical surface having the same radius of curvature R2 all along the upper and lower portions of the cab 3. The radius of curvature R2 is set to be smaller than the radius of curvature R1 of the cylindrical surface area 10a in the front half portion mentioned above, and is brought into inner contact with the front half portion of the outer side surface portion 10 via the boundary line al. In the present embodiment, the rear half portion is constituted by a single cylindrical surface having the same radius of curvature R2, however, the rear half portion may be made, for example, such as to displace the center of the circular arc having the same radius of curvature R2 forward as going upward so as to make the upper end edge thereof slightly inclined to the inner side of the cab 3.

Further, upper and lower guiding rail portions 19 and 20 for guiding the opening and closing operation of the slide door 16 are provided between front ends of upper and lower horizontal bridges 17 and 18 arranged in the upper and lower ends of the outer side surface portion 10 and the intermediate pillar 11. A specific structure of the guiding rail portions 15, 19 and 20 will be described in detail below.

In the above mentioned embodiment of the cab 3, the shape of the slide door 16 has the same curved surface shape as the front half portion in the outer side surface portion 10 of the cab 3. That is, the portion from the lower end of the slide door 16 to one third height of the slide door 16 is constituted by a part of the cylindrical body having a parallel circular arc surface on the circular arc surface having the radius of curvature R1, and the upper side thereof is formed in a three dimensional curved surface shape obtained by gradually reducing the radius of curvature toward the upper portion so that the upper end edge forms a circular arc parallel to the circular arc having the radius of curvature Rn.

Figure 5A:
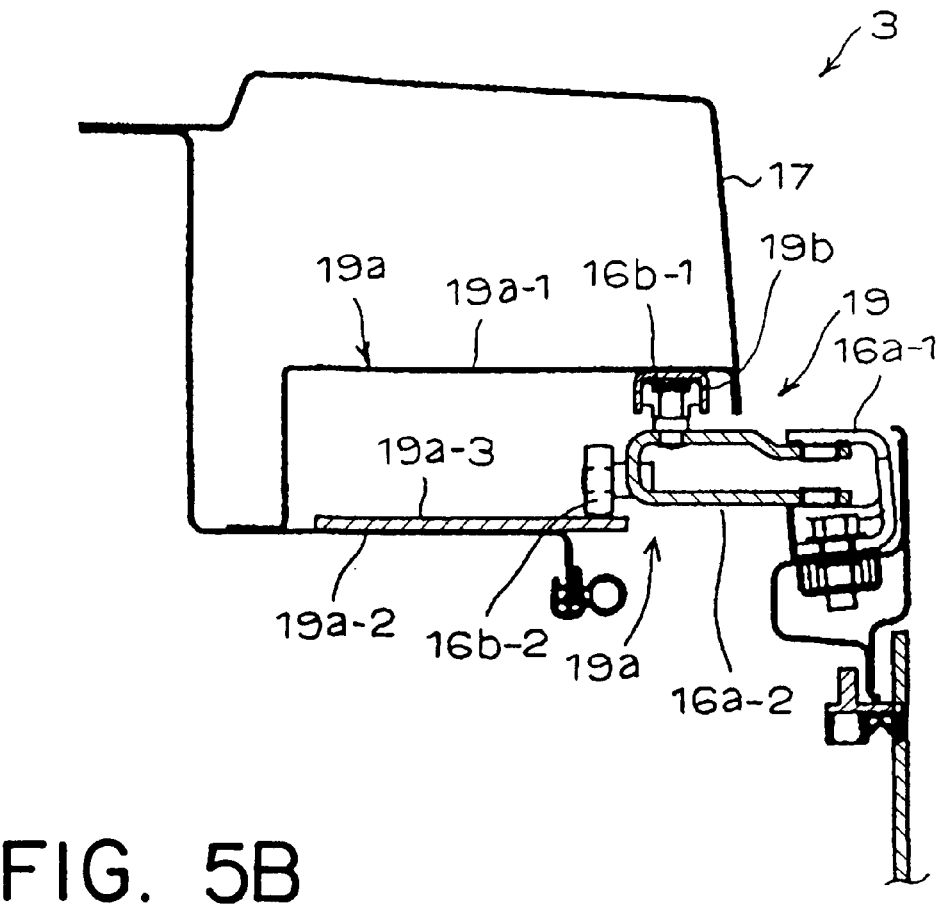
FIGS. 5A and 5B are structural explanatory views showing a supporting structure of the slide door in accordance with a first embodiment of the present invention.
Figure 5B:
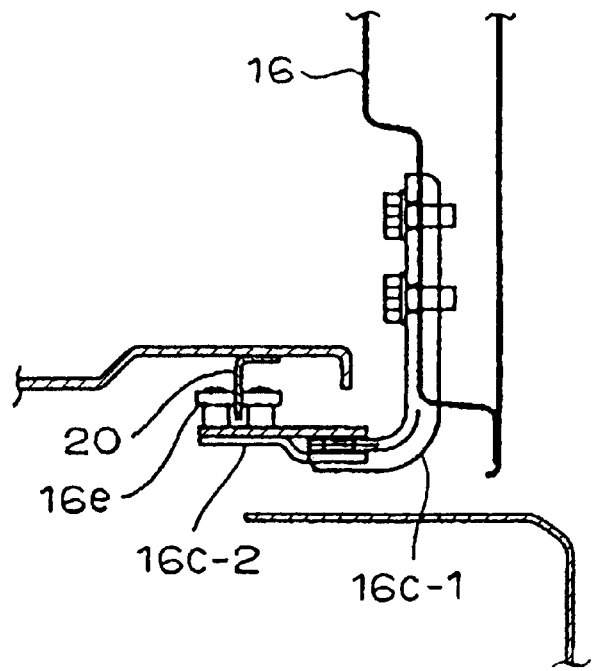
Figure 6:
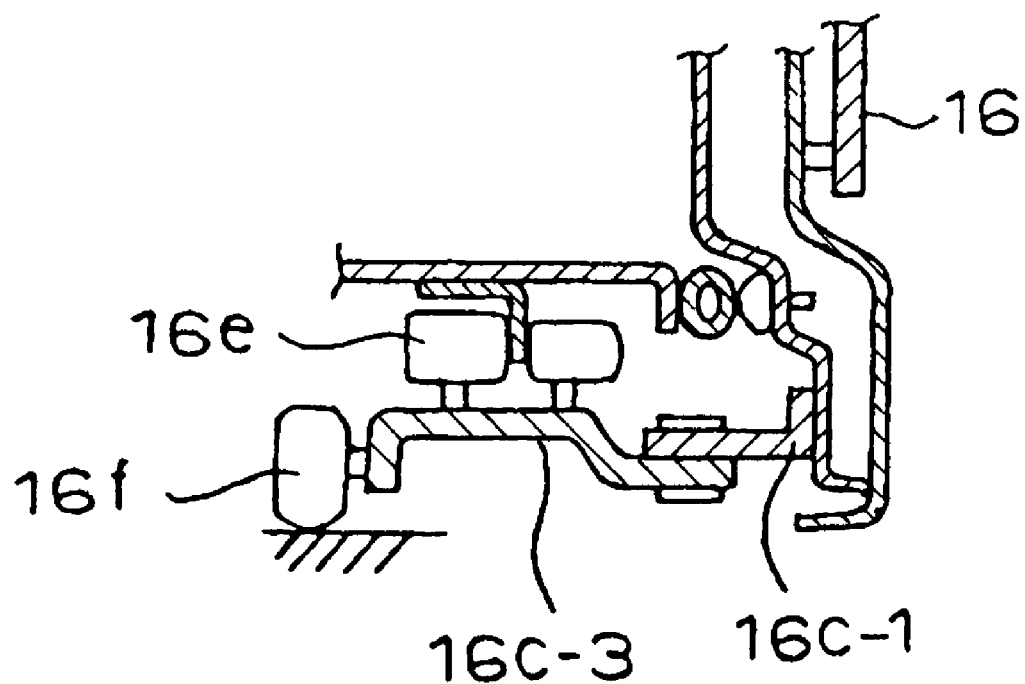
FIG. 6 is a structural explanatory view showing a supporting structure of the slide door in accordance with a second embodiment of the present invention.
Figure 7A:
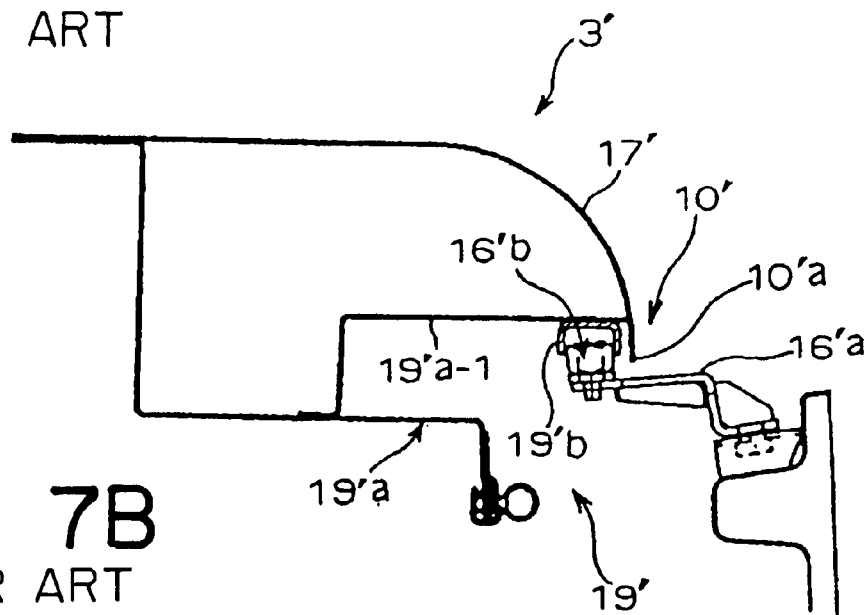
FIGS. 7A to 7C are structural explanatory views showing a supporting structure of a conventional slide door.

Rolling rollers are respectively mounted to an upper end portion and a lower end portion of the front end edge and a center portion in a vertical direction of the rear end edge in the slide door 16, and the slide door 16 is opened and closed while the respective rollers are supported and guided along the upper, middle and lower guiding rail portions 19, 15 and 20 provided in the outer side surface portion 10 of the cab 3 as mentioned above. A description will be in particular given of a supporting structure of the slide door 16 by the rollers and the guiding rail portions 15, 19 and 20 in accordance with the present embodiment with reference to FIGS. 5A, 5B, 6, 7A to 7C by comparing with the conventional example of the supporting structure of the slide door. FIGS. 5A, 5B, and 6 show first and second embodiments of the supporting structure of the slide door 16, and FIGS. 7A to 7C show a supporting structure of a conventional slide door 16'.

Firstly, the embodiment of the supporting structure of the conventional slide door 16' is described with reference to FIGS. 7A to 7C. FIG. 7A shows a supporting structure of the upper end portion of the slide door 16' with respect to an outer side surface portion 10' of a cab 3', and an upper guiding rail portion 19' is provided in a lower end portion of an upper horizontal bridge 17'. The upper guiding rail portion 19' is structured such that its cross section is formed in a rectangular shape and a lower corner portion of an outer side thereof is largely cut so as to form a corner cylindrical portion 19'a. An inverted U-shaped upper guiding rail 19'b is adhered to a ceiling portion 19'a-1 along an upper end edge portion 14'a of an opening portion 14'. A bracket 16'a substantially horizontally protruded toward the outer side surface portion 10' of the cab 3' from an inner surface of the slide door 16' is provided in an upper portion of the front end edge of the slide door 16', and an upper guide roller 16'b fitted to the upper guiding rail 19'*b* and rotating around a substantially vertical axis is mounted to a front end thereof.

Figure 7B:
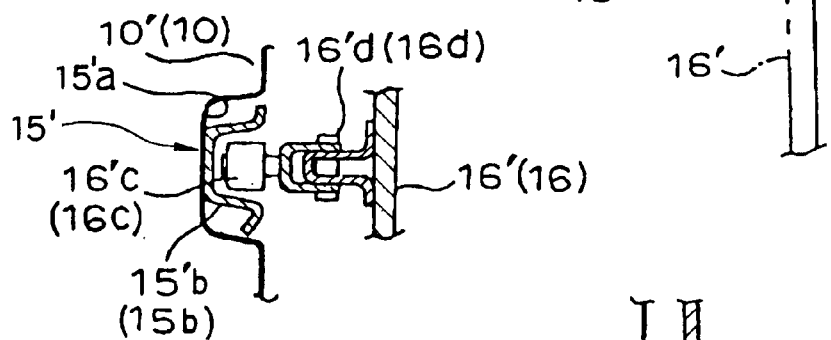

FIG. 7B shows an embodiment of a middle supporting structure of the slide door. The supporting structure of the slide door 16' is the same as the supporting structure of the slide door 16 in accordance with the present embodiment mentioned above, and is constituted by a middle guiding rail portion 15' formed in a rear half portion of the outer side surface portion 10' of the cab 3' and a middle guide roller 16'*c* fitted to the middle guiding rail portion 15' so as to freely roll. The middle guiding rail portion 15' is constituted by a recess groove portion 15'*a* formed in a horizontal direction between front and rear portions of a rear half portion of the outer side surface portion 10' and a middle guiding rail 15'*b* having a C-shaped cross section and adhered along a bottom surface of the recess groove portion 15'*a*. A middle guide roller 16'*c* is pivotally supported to a bracket 16'*d* horizontally protruding toward the cab 3' from a rear end center of the slide door 16' so as to freely roll around the vertical axis and freely swing in a longitudinal direction.

Figure 7C:
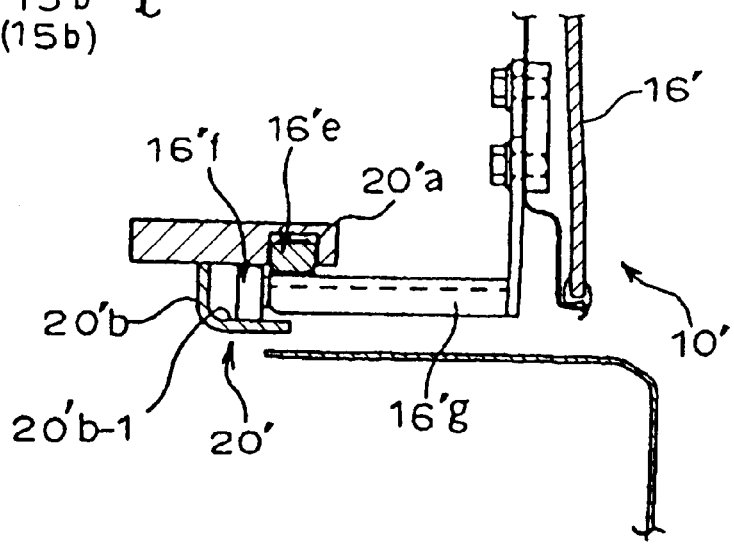

FIG. 7C shows a lower supporting structure of the slide door 16' in the lower end. The supporting structure is constituted by a lower guiding rail portion 20' extended to a front surface lower portion of an intermediate pillar 11' from a front end lower portion of an outer side surface portion 10' of the cab 3', and first and second lower guide rollers 16'*e* and 16'*f* mounted to the front end lower portion of the slide door 16' and fitted to the lower guiding rail portion 20' so as to freely roll. The lower guiding rail portion 20' is constituted by a guide rail 20'*a* formed in an inverted recess groove and provided on a back surface of a floor surface of the cab 3' in such a manner as to extend to the intermediate pillar 11', and a rolling surface forming member 20'*b* formed in an L-shaped cross sectional shape and suspended to the back surface of the floor surface.

Further, the first and second lower guide rollers 16'*e* and 16'*f* are mounted to the front end lower portion of the slide door 16' and are supported to a front end portion of a lower bracket 16'*g* formed to have a horizontal L-shaped cross section and horizontally protruding toward the cab 3' so as to freely roll in such a manner as to cross their rolling axes. The first lower guide roller 16'*e* rolling around the vertical axis is fitted to the recess groove shaped guiding rail 20'*a* so as to freely roll, and the second lower guide roller 16'*f* rolling around the horizontal axis is mounted on a roller rolling surface 20'*b*-1 of the rolling surface forming member 20'*b* formed to have an L-shaped cross section so as to freely roll.

The embodiment of the supporting structure of the slide door 16' in accordance with the conventional art is structured as mentioned above, the upper supporting structure of the slide door 16' is structured such that the upper guide roller 16'*b* is only fitted into the guiding rail 19'*b* having the inverted U cross section and adhered to the horizontal bridge 17' arranged in the panel upper end of the outer side surface portion 10' from below so as to be rolled and guided, and the middle supporting structure is structured such that the middle guide roller 16'*c* is fitted sideways to the guiding rail portion 15' having the C-shaped cross section and horizontally formed in the panel rear half portion of the outer side surface portion 10' so as to be rolled and guided. And with respect to the lower supporting structure of the slide door 16', the first lower guide roller 16'*e* rolling around the vertical axis is rolled and guided within the recess groove shaped guiding rail 20'*a* and the second lower guide roller 16'*f* rolling around the horizontal axis is rolled and guided on the roller rolling surface 20'*b*-1 of the rolling surface forming member 20'*b* having the L-shaped cross section.

A portion for placing the lower supporting structure corresponds to a portion stepped by working shoes or the like when the operator gets on and off and a portion where dusts such as the earth and sand are much accumulated and solidified in comparison with the other portions. In particular, in the placing portion of the rolling surface forming member 20'*b* formed in the L-shaped cross sectional shape, the dusts such as the earth and sand entered therein are hard to be removed, whereby it may happen that the door can not be opened and closed. On the contrary, in the lower supporting structure disclosed in the publication of Japanese Utility Model mentioned above, since the rolling rollers are fitted to the rail having the inverted U-shaped cross section from below so as to freely roll, the dusts such as the earth and sand are hard to be accumulated within the rail, so that the problem mentioned above does not exist.

In the conventional slide door 16' mentioned above, the guide rollers 16'*b*, 16'*c*, 16'*e* and 16'*f* provided in three points comprising the front end upper portion, the front end lower portion and the rear end edge center portion in the slide door 16' are respectively supported, guided and slid by the guiding rails 19'*b*, 15' and 20'*a* and the roller rolling surface 20'*b*-1 extended along the upper end edge of the front half portion, the lower end edge of the front half portion and the upper and lower center portions of the rear half portion of the cab 3'. Meanwhile, the slide door disclosed in the publication of Japanese Utility Model is supported and guided by four guide rollers disposed in the front and rear portions of the upper end edge portion and the front and rear portions of the lower end edge portion so as to be opened and closed.

If the front window portion of the cab 3 is rearward inclined and the shape of the outer side surface portion 10 is formed in the three dimensional curved surface mentioned above, as shown in FIG. 4A, the upper end edge and the lower end edge of the front half portion of the cab 3 are structured such that the upper end edge draws the circular arc having a small radius of curvature between the front end and the rear end thereof, the lower end edge draws the circular arc having the radius of curvature larger than the radius of curvature of the upper end edge between the front end and the rear end, in a plan view shown in FIG. 4B, and both of the circular arcs are combined on the boundary line a1 in the rear end and connected to the circular arc in the rear half portion of the cab 3.

Respective guiding tracks of the upper and middle guide rollers 16'*b* and 16'*c*, the first lower guide roller 16'*e* and the second lower guide roller 16'*f* rolling on the roller rolling surface 20'*b*-1 generated by conventional three guide rails 19'*b*, 15' and 20'*a* arranged in the upper, middle and lower portions shown in FIGS. 7A to 7C are structured such that the middle guide roller 16'*c* is guided to the rear end of the outer side surface portion 10' along the curved surface of the rear half portion of the outer side surface portion 10' and the upper guide roller 16'*b* entering inside the cab 3' is guided near the boundary line a1 along the small circular arc. At this time, when guiding the first lower guide roller 16'*e* at the lower end arranged in the outermost side of the cab 3' to be on the boundary line a1 without deforming the slide door 16', the lower end of the front end edge in the slide door 16' greatly protrudes to the outer side as shown by a broken line in FIG. 4C.

This can be applied to the slide door described in the publication of Japanese Utility Model mentioned above in the same manner, however, in accordance with the supporting structure of the slide door described in the publication, since the guide rollers are mounted to four corner portions of the slide door, a four-point supporting structure is formed. Thus, since it is impossible to forcibly move the slide door along the outer side surface shape of the rear portion of the cab at a time of opening the slide door, it is unavoidable to place the upper and lower rails toward the position apart from the outer side surface of the cab at the rear portion, so that the rear end edge of the slide door 16' is largely protruded to the outer side in the same manner as the conventional supporting structure mentioned above.

Accordingly, in the slide door 16' having the conventional supporting structure, when it is intended to receive the lower end of the front end edge or the rear end edge of the slide door 16' within a swing radius of a revolving deck (not shown) at the time of opening the slide door 16', it is necessary to determine a curvature of the curved surface such that the outer side surf ace portion 10' of the cab 3' is located inside the swing radius by a protruding amount of the lower end of the front end edge of the slide door 16', so that an interior volume of the cab 3' is reduced. This has no relation with a matter whether or not the radius of curvature of the rear half portion of the outer side surface portion 10' is set to be the same as that of the front half portion.

On the contrary, the supporting structure of the slide door 16 in accordance with the embodiment of the present invention solves the problems mentioned above, and further, when the protruding amount to the outer side of the slide door 16 is reduced as much as possible, in addition to the shape of the rear half portion of the outer side surface portion 10 of the cab 3, the lateral width of the cab 3 can be made at the m most within the swing radius of the revolving deck 2, and it is possible to obtain a function of enabling a smooth opening and closing operation of the slide door 16.

FIGS. 5A and 5B show an embodiment of a supporting structure of the slide door 16 in accordance with a first embodiment of the present invention. A point different from the conventional supporting structure shown in FIGS. 7A to 7C and the supporting structure disclosed in the publication of Japanese Utility Model mentioned above resides in a configuration of a lower supporting structure and a guide roller. That is, in the conventional lower supporting structure, the single guide roller is fitted to the U-shaped or the inverted U-shaped rail so as to freely roll, however, the guide rollers 16e in accordance with the present invention are structured such that two or more guide rollers 16e as a set are fitted in such a manner as to hold one sheet-like rail 20 comprising a vertical surface suspended to a floor surface therebetween from below, and all the guide rollers 16e are formed in a drum shape. More preferably, the structure is made such that all of roller supporting body for the respective guide rollers arranged at three portions comprising upper, middle and lower portions in accordance with the present invention freely swing around a horizontal axis with respect to the vertical axis.

This will be in particular described with reference to FIG. 7B. In this case, since the supporting structure of the guide roller 16c at a middle position provided with the middle guide roller 16c fitted to the middle guiding rail portion 15 formed in the rear half portion of the outer side surface portion 10 of the cab 3 so as to freely roll substantially coincides with the supporting structure of the conventional guide roller 16'c mentioned above except the point that the shape of the guide roller is formed in the drum shape as mentioned above, the description thereof will be omitted.

FIG. 5A shows an upper supporting structure of the slide door 16 in accordance with the present embodiment. The upper guiding rail portion 19 arranged in the lower end portion of the upper horizontal bridge 17 has a rectangular frame shaped cross section, and is constructed as a corner cylindrical portion 19a obtained by extending a bottom portion 19a-2 outward in comparison with the conventional one and cutting an outer lower end corner portion less than the conventional one. A reinforcing sheet member 19a-3 is attached to an upper surface of the bottom portion 19a-2 for reinforcing the guide roller rolling surface. An inverted U-shaped upper guiding rail 19b is adhered to a ceiling portion 19a-1 of the corner cylindrical portion 19a along an upper end edge 14a of the opening portion 14 in the same manner as that of the conventional one. A supporting frame body 16a-1 formed in a C shape toward in a front view to open the outer side surface portion 10 from an inner surface of the cab 3 is substantially horizontally protruded from an upper end of the front end portion of the slide door 16. A horizontal U-shaped roller supporting body 16a-2 is supported to the supporting frame body 16a-1 so as to freely swing a base end with respect to a horizontal surface, a first guide roller 16b-1 freely rolling around a substantially vertical axis is pivotally supported on an upper surface of the front end of the roller supporting body 16a-2, and a second guide roller 16b-2 freely rolling around the horizontal axis is pivotally supported to a side surface of the front end.

Then, the first guide roller 16b-1 is fitted to the inverted U-shaped upper guiding rail 19b arranged in the ceiling portion 19a-1 of the corner cylindrical portion 19a and rolls while restricting a movement of the slide door 16 in inner and outer directions of the cab. Further, the second guide roller 16b-2 rolls as being mounted on the roller rolling surface on the upper surface of the reinforcing sheet member 19a-3 of the corner cylindrical portion 19a. Accordingly, almost all load of the slide door 16 in accordance with the present embodiment is received by the roller rolling surface on the upper surface of the reinforcing sheet member 19a-3.

A track of the inverted U-shaped upper guiding rail 19b for rolling and guiding the first guide roller 16b-1 is set to largely protrude outward at first so as to positively move the first guide roller 16b-1 onto a circular arc having the same radius of curvature as that of a circular arc formed by the lower end edge of the front half portion of the outer side surface portion 10 of the cab 3 at a beginning stage for opening the slide door 16, and is set to protruded further outward while curving in a shape along the front surface of the intermediate pillar 11, in order that the slide door 16 smoothly rides over a step portion formed by a front surface of the intermediate pillar 11 at a time of finishing the opening operation of the slide door 16. Accordingly, the track is set to connect to the circular arc having a large radius of curvature by the curved line having a small radius of curvature so that the front end upper portion of the slide door 16 in accordance with the present embodiment quickly moves the track of the upper guiding rail 19b at a time of starting the opening operation onto the same circular arc as the circular arc formed by the lower end edge of the front half portion of the outer side surface portion 10.

When setting the track of the upper guiding rail 19b as mentioned above, the three dimensional curved area formed in the upper portion of the front half portion of the slide door 16 is deformed so as to be close to the two dimensional curved shape (the cylindrical surface), so that the first upper guide roller 16b-1 fitted to the guiding rail 19b so as to freely roll and the roller supporting body 16a-2 of the second upper guide roller 16b-2 rolling on the roller rolling surface on the upper surface of the bottom portion 19a-2 are slightly inclined downward so as to be fixed to the door not horizontally, and the peripheral surface shapes of the respective first and second guide rollers 16b-1 and 16b-2 are formed in a drum shape so as to roll while contacting with the respective rolling surfaces always in a point contact state. Accordingly, it is possible to reduce a friction at a rolling time as much as possible and it is possible to perform a smooth opening and closing operation even after the slide door 16 is deformed.

FIG. 5B shows a lower end supporting structure of the slide door 16 in accordance with the present embodiment. The supporting structure is constituted by the lower rail portion 20 extended from the lower end portion of the front end edge of the outer side surface portion 10 of the cab 3 to the front surface lower portion of the intermediate pillar 11 so as to form a circular arc having the radius of curvature R1, and the group of lower guide rollers 16e mounted to the lower end portion of the front end edge of the slide door 16 and fitted to the lower rail portion 20 so as to freely roll. The lower rail portion 20 is constituted by one sheet member suspended to the back surface of the peripheral edge portion on the floor surface of the cab 3.

In accordance with the present embodiment, the group of lower guide rollers 16e are constituted by four rollers obtained by arranging two rollers in two rows in a longitudinal direction, and are rotatably supported to four pivotal axes protruding upward from the upper surface of the roller supporting body 16c-2 supported to an L-shaped supporting bracket 16c-1 adhered to the lower end portion of the front end edge of the slide door 16 so as to freely swing within the horizontal surface. The group of lower guide rollers 16e rotating around the vertical axis are fitted so that a pair of two lower guide rollers 16e grip the rail portion 20 from right and left sides. The lower guide roller 16e is also formed in a drum shape. In this case, in accordance with the present embodiment, since the supporting brackets in all the guide rollers arranged in the upper, middle and lower portions are mounted so as to freely swing around the vertical axis, the slide door 16 can be more smoothly and lightly opened and closed in combination with the shape of the lower guide roller 16e.

On the assumption that the guiding track of the first upper guide roller 16b-1 is a simple circular arc having the same radius of curvature R1 as that of the circular arc extending along the lower end edge of the three dimensional curved surface area 10a, the lower guide roller 16e largely protrudes outward as shown by an imaginary line in FIG. 4C. Then, the structure is made such as to positively guide the first upper guide roller 16b-1 at the beginning stage of the opening operation of the slide door 16 so as to quickly move onto the circular arc having the same radius of curvature R1 as that of the lower end edge of the front half portion of the outer side surface portion 10 as mentioned above, thereby moving the lower guide roller 16e close to the cab 3. However, since it is impossible to effectively reduce the protruding amount mentioned above only by the structure, in accordance with the present embodiment, it is set such that the guiding track of the lower rail portion 20 positively draws the lower guide roller 16e to the cab 3 side so as to move the lower guide roller 16e closer to the cab 3 side.

In accordance with the present embodiment, in addition to the function by the supporting mechanism mentioned above, by effectively utilizing the structure of making the radius of curvature R2 in the rear half portion of the outer side surface portion 10 smaller than the radius of curvature R1 of the front half portion which corresponds to the characteristics of the invention, the lateral width of the cab 3 can be as large as possible and it is possible to smoothly and lightly open and close the slide door 16.

FIG. 6 shows a second embodiment of a supporting structure of a slide door in accordance with the present invention.

In this embodiment, in the same manner as that of the upper supporting mechanism mentioned above, a guide roller supporting body 16c-3 is supported to the front end of the supporting bracket 16c-1 so as to freely swing within the horizontal surface.

Four supporting axes protrude upward from an upper surface of the guide roller supporting body 16c-3, and four first lower guide rollers 16e are rotatably supported to the supporting axes. Further, a second lower guide roller 16f rotating around the horizontal axis is mounted to a front end side surface of the guide roller supporting body 16c-3, and the second lower guide roller 16f is mounted on an upper surface of a deck so as to roll. In accordance with the structure described above, since the weight of the slide door 16 can be separately supported by the upper and lower supporting mechanisms rather than applying all the weight of the slide door 16 to the upper supporting mechanism as in the first embodiment, it is not necessary to independently increase a rigidity of each of the rolling surfaces on which the upper and lower second guide rollers 16b-2 and 16f roll.

FIG. 8 shows a moving track of the slide door 16 when the curved surface of the rear half portion of the outer side surface portion 10 of the cab 3 is constituted by the cylindrical surface having the same radius of curvature as the radius of curvature R1 in the lower end of the front half portion. In FIG. 8, an area surrounded by a two-dot chain line shows a surface of the outer side surface portion 10 of the cab 3 and a portion expressed by a single-dot chain line in FIG. 8 shows a rotating area of the revolving deck 2. When setting the radius of curvature in the rear half portion of the outer side surface portion 10 to be the same as that R1 of the front half portion, the rear end edge of the slide door 16 moves along the circular arc surface having the same radius of curvature as that of the outer side surface portion 10 at a time when the slide door 16 is opened even in the case of employing the supporting and guiding structure of deforming the three dimensional curved surface of the slide door 16 to the two dimensional curved surface as mentioned above, so that the rear end edge of the slide door 16 protrudes outward at a degree that the radius of curvature is larger, as shown in FIG. 8. As a result, when the rear end edge is structured such as to be received inside the maximum swing radius of the revolving deck 2, it is necessary to receive all the curved surfaces having the same radius of curvature in the outer side surface portion 10 including the front and rear center portions within the maximum swing radius, whereby an effective space of the cab 3 is reduced. In this case, since a whole of the outer side surface portion 10 is similar to a part of the single cylindrical body, the slide door 16 can be smoothly opened and closed.

Figure 9:
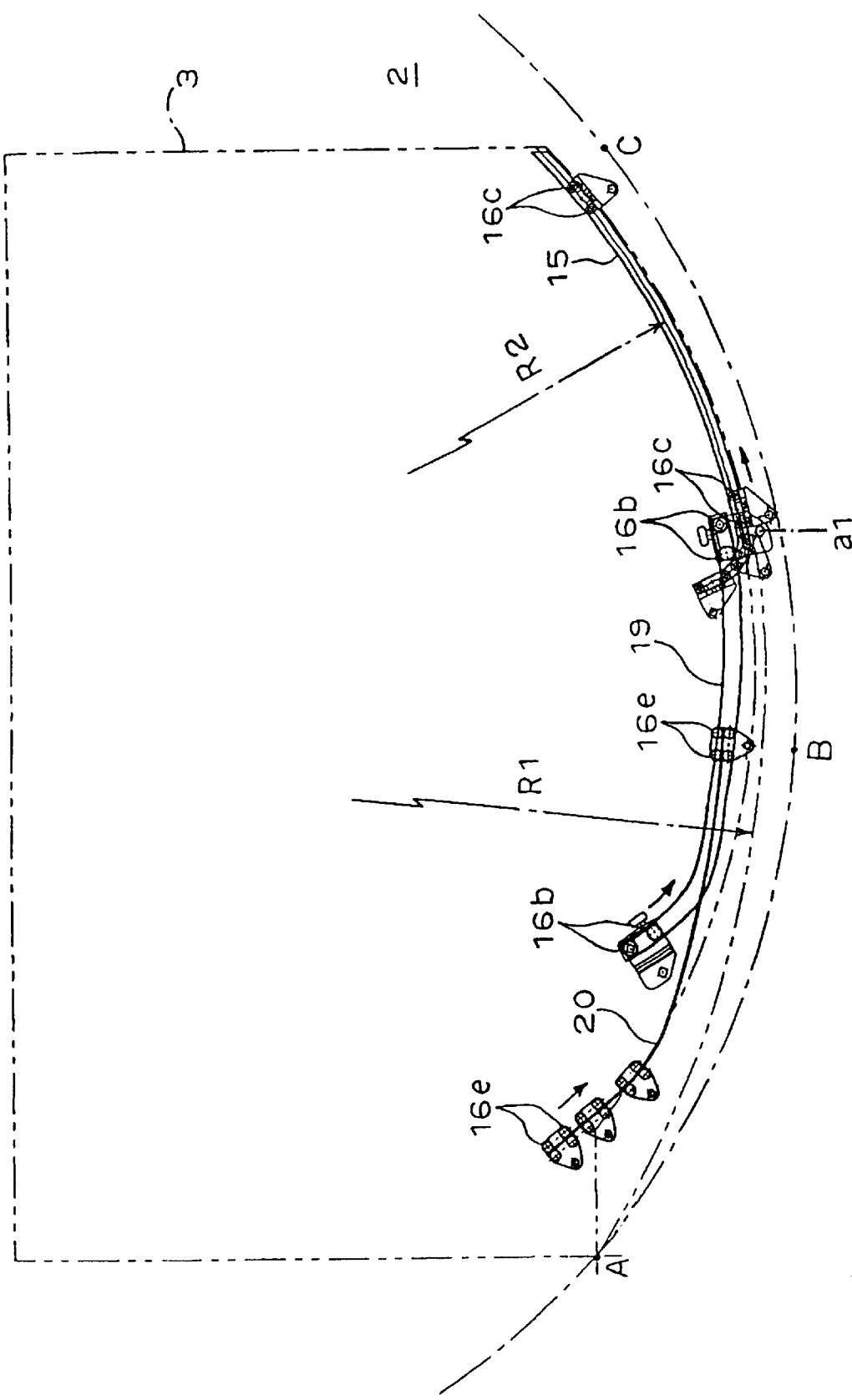
FIG. 9 is a plan view showing an example of a guiding track of the slide door when making a radius of curvature of a rear half portion in the lower end edge of the outer side surface portion of the cab smaller than that of a front half portion.

FIG. 9 shows a moving track of the slide door 16 when making the occupied area of the cab 3 in accordance with the present invention for being received within the maximum swing radius of the revolving deck 2 maximum. When arranging the radius of curvature R2 of the rear half portion of the outer side surface portion 10 to be smaller than the radius of curvature R1 of the front half portion and guiding the rear end edge of the slide door 16 along the surface of the rear half portion by the supporting mechanism of the center portion, the rear end edge of the slide door 16 can be located inside the swing radius as shown in FIG. 9 in comparison with the case that the radius of curvature of the rear half portion and the radius of curvature of the front half portion are set to be the same, however, the protruding amount to the outer side of the cab of the lower end portion of the front end edge in the slide door 16 shown by a broken line in FIG. 4C is widely increased. Accordingly, by employing the supporting mechanism mentioned above and making the radius of curvature R2 of the rear half portion of the outer side surface portion 10 smaller than the radius of curvature R1 of the front half portion, it is possible to move all the curved surface of the outer side surface portion 10 more to the outer side than the case that the radius of curvature of the front half portion, in the slide door 16 is made to be the same as the radius of curvature of the rear half portion as far as the swing radius is the same, whereby it is possible to increase an interior volume of the cab 3.

In FIG. 9, an area surrounded by a two-dot chain line shows the surface of the outer side surface portion 10 of the cab 3, and a portion expressed by a single-dot chain line in FIG. 9 shows the rotating area of the revolving deck 2. As is understood from FIG. 9, in order to determine the placing position of the cab 3 in accordance with the present embodiment on the revolving deck 2, at first, a position A of the lower end of the front end edge of the cab 3 is set on the outermost circumference within the rotating area. Next, a position. B of the lower end of the front end edge of the door 16 when completely opening the slide door 16 is set on the outermost circumference within the rotating area in the same manner. Finally, a position C of the lower end of the rear end edge of the slide door 16 when completely opening the slide door 16 is set within the outermost circumference among the rotating area. The position C of the lower end of the rear end edge of the slide door 16 when completely opening the slide door 16 is determined depending on the radius of curvature of the rear half portion of the outer side surface portion 10.

The description mentioned above is given of the typical embodiments in accordance with the present invention, however, the present invention is not limited to the embodiments described above. For example, as the supporting structure of the slide door, it is possible to employ the same structure as the conventional one except the structure of forcibly guiding the upper and lower end portions of the front end edge of the door to the outer side and the inner side accordingly, the supporting mechanism of the slide door in accordance with the present invention can be, of course, employed for a supporting mechanism of a slide door placed in a common vehicle or the like, as well as being employed for the construction machine as in the embodiment described above.

What is claimed is:

1. A supporting mechanism of a slide door placed in an entrance/exit, comprising:

upper and lower rails extending along edge portions of upper and lower ends of the entrance/exit, and guide rollers respectively provided at least at upper and lower end portions of a front edge of said slide door, wherein said upper rail comprises a first rail having a free end at a lower end edge thereof, and a second rail substantially horizontally extending toward an outer side, wherein said upper guide rollers have first rolling rollers comprising a set of two or more rollers having a substantially vertical rolling axis, and a second rolling roller having a substantially horizontal rolling axis, wherein said first rolling rollers of the set of two or more rollers are gripped and supported with respect to said first rail from below, and said second guide roller is supported and guided on an upper surface of said second rail so as to roll, and wherein said lower rail is disposed under a floor of a vehicle cab and has one narrow plate rail having a lower end edge being a free end, said lower guide rollers having a set of two or more rolling rollers each roller having a substantially vertical rolling axis, and said set of two or more rolling rollers hold and support said lower rail therebetween from below so as to freely roll.

2. A supporting mechanism of a slide door according to claim 1, wherein each of said guide rollers is formed in a drum shape.

3. A supporting mechanism of a slide door according to claim 2, wherein a supporting portion of each of the guide rollers having the substantially vertical rolling axis can rotate around the vertical axis.

4. A supporting mechanism of a slide door according to claim 1, wherein a supporting portion of each of the guide rollers having the substantially vertical rolling axis can rotate around the vertical axis.

5. A supporting mechanism of a slide door according to claim 1, wherein the supporting mechanism is provided on a slide door structure of a cab of a construction machine.

* * * * *